United States Patent Office 3,447,512
Patented June 3, 1969

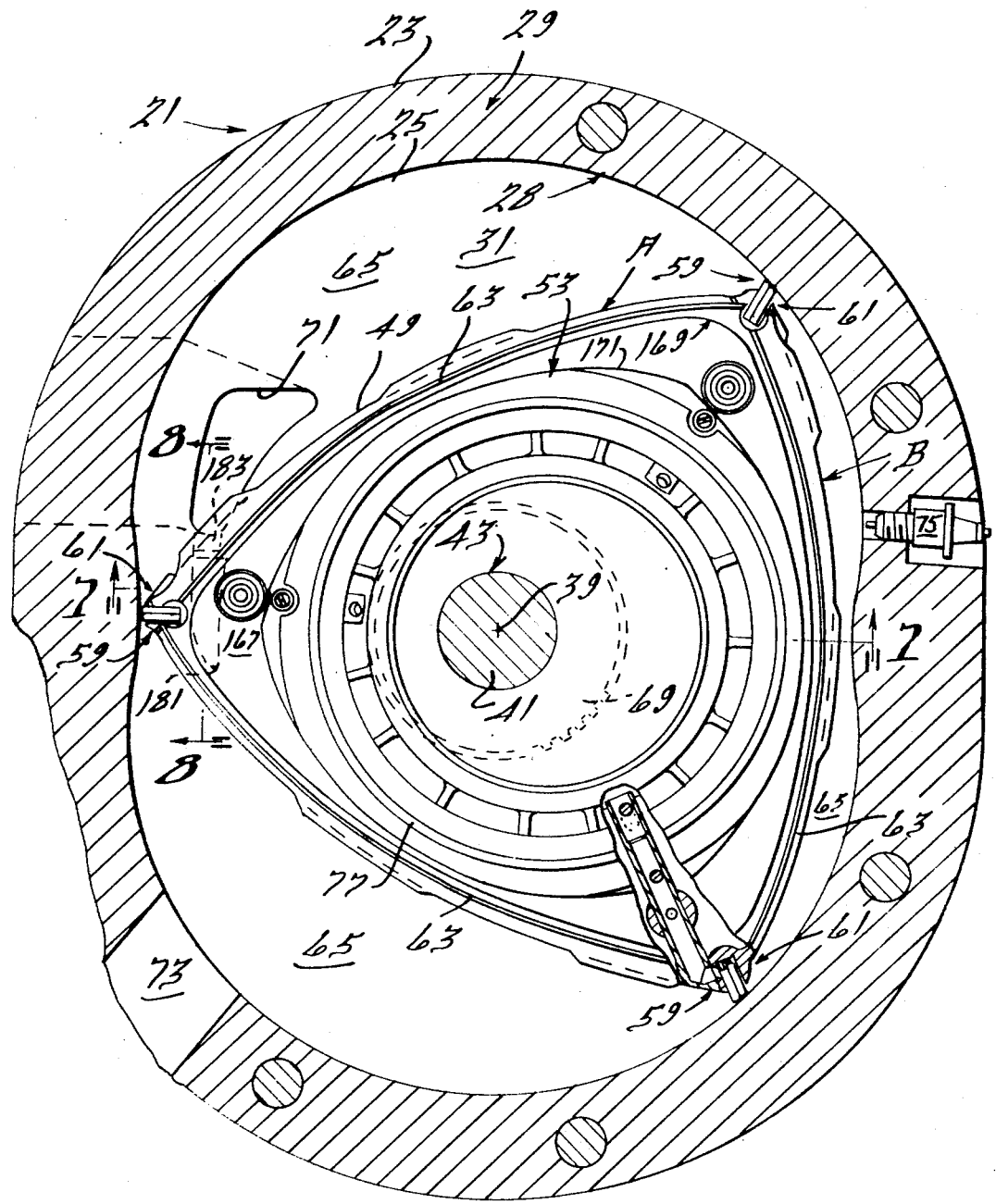

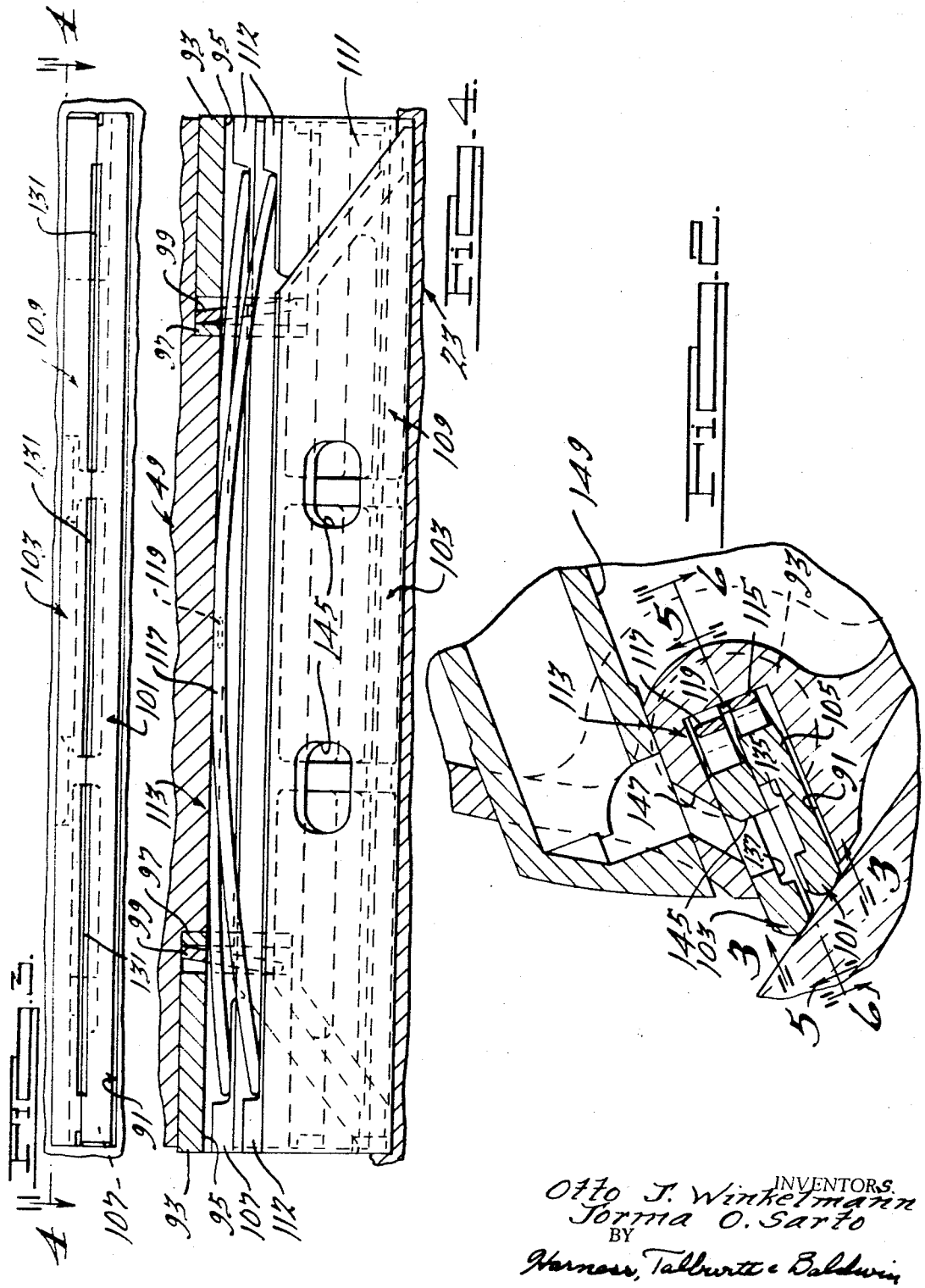

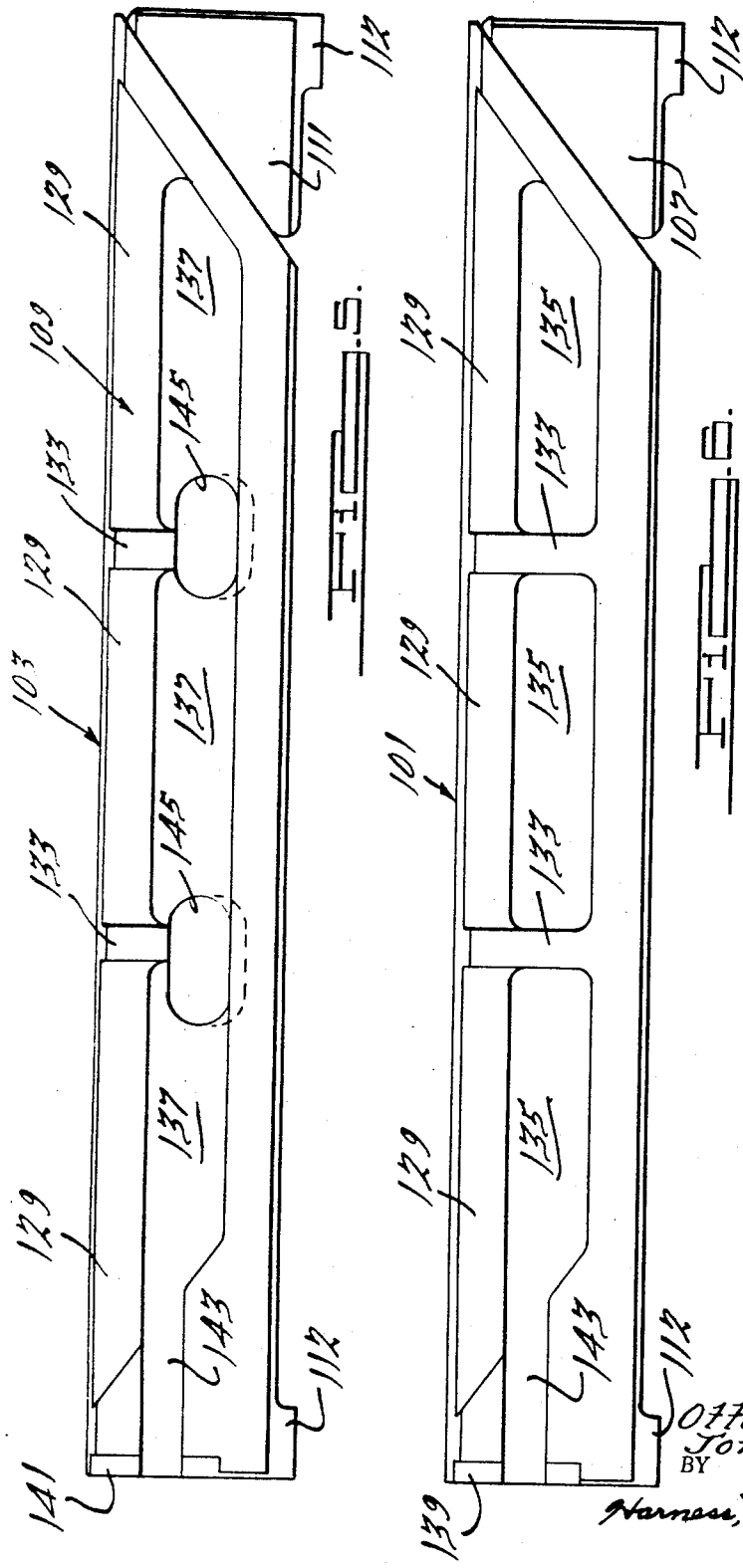

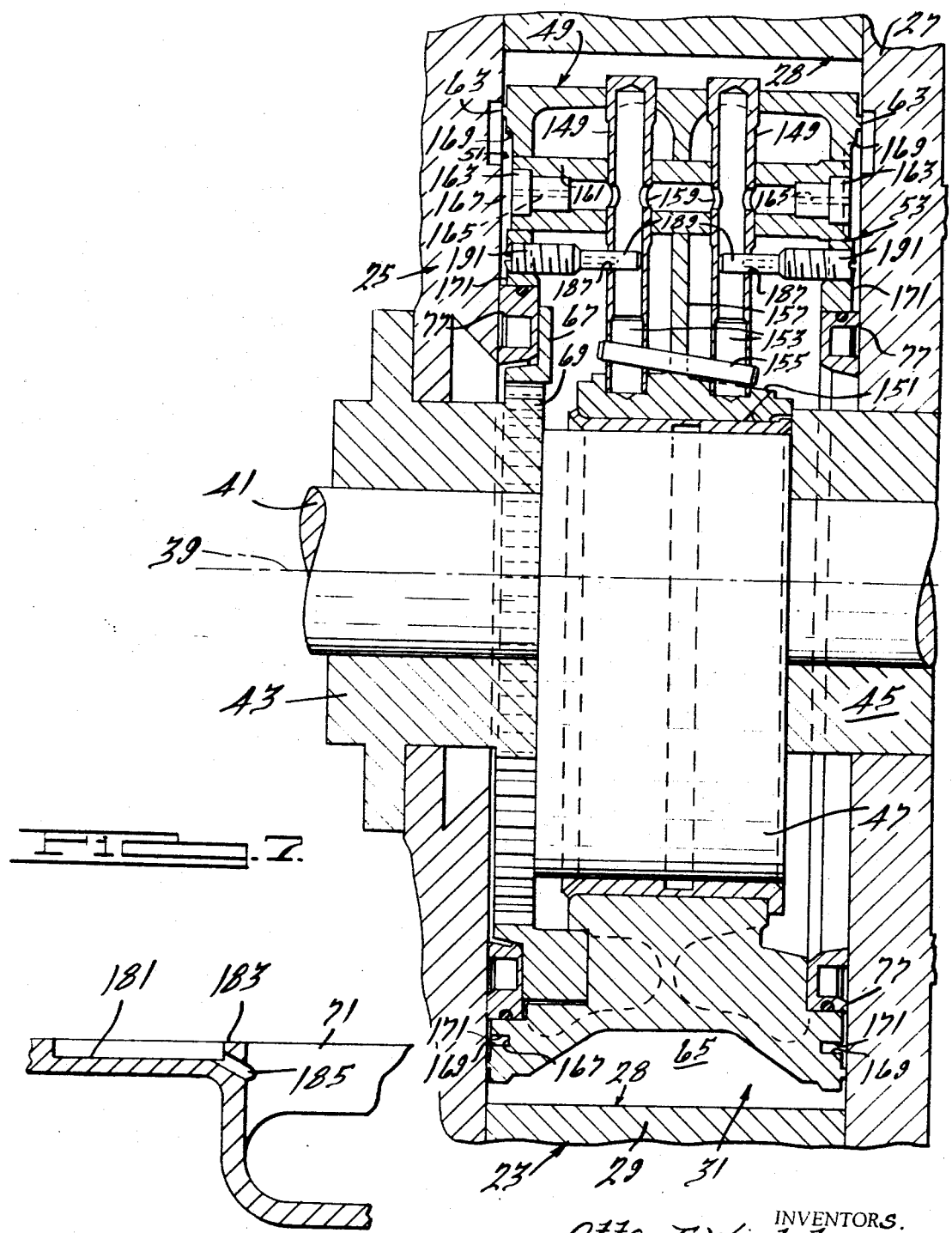

3,447,512
ROTARY MECHANISM
Otto J. Winkelmann, Birmingham, and Jorma O. Sarto, Orchard Lake, Mich., assignors to Chrysler Corporation, Highland Park, Mich., a corporation of Delaware
Filed Feb. 16, 1967, Ser. No. 616,590
Int. Cl. F01c *19/02;* F02b *53/00*
U.S. Cl. 123—8                                      16 Claims

ABSTRACT OF THE DISCLOSURE

Rotary combustion engine having dual seals on each apex of a rotor, the seals being vented through the rotor to the intake ports for returning a portion of the unburned fuel which is tending to be forced passed the seals to the intake ports, thereby reducing the emission of unburned fuel from the engine.

Background of the invention

This invention relates to rotating combustion mechanisms or engines of the type shown in U.S. Patent 2,988,065, and more particularly to a vented seal means for inhibiting emission of unburned fuel from the engine.

There are several types of rotating combustion engines and the present invention is described in connection with, although it is not limited to, a rotary combustion engine comprising an outer body having an axis, end walls axially spaced from one another, and a peripheral wall interconnecting the end walls. The inner surfaces of the peripheral wall and the end walls form a cavity within which an inner body or rotor is mounted. The inner surface of the peripheral wall is substantially parallel to the axis of the cavity and has a multi-lobed profile which is preferably an epitrochoid. The axis of the rotor is parallel to but spaced from the axis of the outer body cavity and the rotor has end faces disposed adjacent the end walls of the body. The rotor also has a plurality of circumferentially spaced apex portions, the number of apex portions being one more than the number of lobes of the epitrochoid of the inner surface.

The rotor is rotatable relative to the outer body in such a manner that the apex portions continuously engage the inner surface of the peripheral wall to form a plurality of working chambers between the rotor peripheral surface and the inner surface. These chambers vary in volume during engine operation as a result of the relative rotation of the rotor and outer body. Rotary engines of this type include at least one intake port or passage in the outer body for admitting the fuel-air mixture to the chambers, an exhaust port or passage in the outer body for venting the chambers, and suitable ignition means so that during engine operation the working chambers of the engine have a cycle of operation which includes the four phases of intake, compression, expansion and exhaust. As described in the aforementioned U.S. patent, this cycle of operation is achieved as a result of the relative rotation of the inner rotor and outer body. To obtain the relative rotation both the inner rotor and outer body may rotate or one, preferably the inner rotor, may rotate while the outer body remains stationary.

The working chambers of the engine, for efficient operation of the latter, should be sealed against leakage. In this regard, an effective seal should be provided between each rotor apex portion and the inner surface of the peripheral wall of the outer body, as well as between the end faces of the rotor and the end walls of the body.

In prior rotary combustion engines of this type there is disposed in a groove in each apex portion of the rotor one or two radially-movable seal strips whereby each adjacent pair of working chambers is separated by an apex seal strip or strips. These seals should withstand the severe combustion pressure and temperatures which occur as each working chamber passes through the intake, compression expansion and exhaust phases of engine operation. During operation of the engine, under certain conditions, the apex seals may lift off and out of contact with the inner surface of the peripheral wall, and move radially inward relative to the peripheral wall. This may be due to several factors, such as for example, minute cavities or minute humps in the surface of the peripheral wall which cause spaces to be formed between the wall and the seals. The apex seals also tend to tilt from the desired radial disposition, so that contact between a seal and the wall of the slot in which the seal is located is reduced from surface contact to a line contact. This tilting is due to the pressure differential between the gases in adjacent chambers. Any apex seal movement results in a loss of sealing action, and in the case of a rotary combustion engine, causes leakage of gases, which are particularly disadvantageous between a working chamber in its compression phase and the adjacent working chamber in its expansion and exhausting phase. As a result of this apex seal movement, the effectiveness of the seal is substantially reduced and gas leakage occurs between the working chambers so that some of the fuel-air mixture is not ignited and escapes past the seal between combustion and expansion chambers. This unburned fuel then passes directly out of the engine through the exhaust system into the atmosphere.

The emission of unburned fuel from rotary combustion engines has presented a substantial obstacle to further development and utilization of the engines. As is well known, control and prevention of emission of unburned fuel, particularly, in combustion engines, is of paramount importance in today's society. Prior attempts at reducing the unburned fuel emission from rotary combustion engines have not been totally acceptable.

Summary of the invention

Briefly, the apparatus of this invention comprises a rotary mechanism having apex portion sealing means adapted to permit unburned fuel and air mixtures, which are tending to escape past the sealing means, to flow through passage forming means in the rotor back toward the fuel intake of the engine, thus inhibiting emission of the unburned fuel into the exhaust system and atmosphere.

Accordingly, one of the primary objects of this invention is to provide a rotary combustion engine having an apex sealing structure which inhibits the emission of unburned fuel from the engine.

Another object of this invention is to provide a rotary combustion engine of the type described wherein the sealing structures provide improved sealing between the apexes of the rotor and the inner surface of the peripheral wall of the outer body.

A further object of this invention is to provide a rotary combustion engine of the class described wherein the sealing structures permit unburned fuel to be recycled through the engine, thus reducing fuel waste.

Still another object of this invention is to provide a rotary combustion engine such as described which eliminates many of the disadvantages of previous apex sealing devices.

A further object of this invention is to provide a rotary combustion engine having novel apex sealing structures which are economical in construction and effcient in operation.

Other objects and advantages of this invention will become apparent as the description progresses.

Description of the drawings

In the accompanying drawings in which one of various possible embodiments is illustrated, FIG. 1 is a schematic and elevational view of a rotary combustion engine embodying this invention, the size of certain parts being exaggerated and other parts being shown in section for clarity;

FIG. 2 is an enlarged fragmentary view of FIG. 1;

FIG. 3 is a fragmentary elevational view looking along line 3—3 of FIG. 2, certain parts being removed for clarity;

FIG. 4 is a section taken along line 4—4 of FIG. 3;

FIGS. 5 and 6 are sections taken along lines 5—5 and 6—6, respectively, of FIG. 2, certain parts being removed for clarity; and FIGS. 7 and 8 are enlarged sections taken along lines 7—7 and 8—8, respectively, of FIG. 1, each view being rotated approximately 90°.

Like parts are indicated by corresponding reference characters throughout the several views of the drawings.

Description of the preferred embodiment

Referring now to the drawings, a rotary mechanism of this invention in the form of an internal combustion engine is generally indicated at 21 and comprises an outer body 23 having axially spaced end walls 25 and 27 (see FIG. 7) and a peripheral wall 29 disposed therebetween to form a cavity 31. Only one cavity 31 is shown herein, but it will be understood that the engine may be constructed with a plurality of cavities located side-by-side, if desired. When the engine is viewed in a plane extending transversely to the axis 39 of the cavity 31, the inner surface 28 of the peripheral wall 29 of the cavity has a multi-lobed profile which preferably is basically an epitrochoid, and preferably has two lobes.

A shaft 41, coaxial with the axis 39, extends through the outer body and is journaled in bearings 43 and 45 carried by the end walls 25 and 27, respectively. The shaft 41 has an eccentric portion 47 on which an inner body or rotor 49 is journaled. The inner body 49 has axially spaced side or end faces generally indicated at 51 and 53 disposed adjacent the outer body end walls 25 and 27, respectively. The inner body 49 also has a plurality of circumferentially-spaced apex portions 59 which, as set forth in the aforementioned patent, are one more in number than the number of lobes in the cavity 31. Each of the apex portions 59 has apex seal and vent means generally indicated at 61 and described in detail hereafter, in sealing engagement with the peripheral wall inner surface 28. The end faces 51 and 53 have end seal means 63 disposed in sealing engagement with the end walls 25 and 27 to form a plurality of working chambers 65 which vary in volume upon rotation of the rotor 49 relative to the outer body 23. The geometrical axis of the rotor is offset from and disposed parallel to the axis 39 of the outer body.

In the engine 21 illustrated, it is to be assumed that the outer body 23 is stationary while the inner body 49 rotates within the outer body. In order to maintain the motion of the rotor 49 relative to the stationary outer body 23 an internal gear 67 (see FIG. 7) is secured to the inner rotor 49 and is disposed in meshing engagement with a gear 69 fixed to the bearing 43 which is secured to the end wall 25 of outer body 23. The fixed gear 69 is coaxial with shaft 41.

The outer body has intake port means 71 in end walls 25 and 27 for supplying an intake charge of fuel to the working chambers 65 and has exhaust port means 73 for discharging the exhaust gases from the engine. Ignition means, shown in the form of a spark plug 75, is provided to ignite the intake charge. As viewed in FIG. 1, the rotor 49 moves in a clockise direction so that each apex portion 59 moves successively past the intake ports 71, the spark plug 75 and the exhaust port 73.

Lubricating oil is provided in the space surrounding eccentric 47 and adjacent gears 67 and 69. To prevent passage of the lubricating oil into the working chambers 65, suitable oil sealing means in the form of one or more oil sealing rings 77 may be provided in the rotor end faces 51 and 53. These sealing rings slide against the adjacent outer body end walls 25 and 27.

The engine so far described is similar to the engine disclosed in the aforementioned United States Patent No. 2,988,065, and reference is made to said patent for a more detailed description of the engine.

As set forth previously, each of the working chambers 65 is separated from the adjacent working chambers by an apex seal and vent means 61. All of the seal and vent means 61 are identical and a description of one will suffice for all. Each of the apex portions 59 is provided with a generally rectangular shaped groove or slot 91 (see FIGS. 2–4) which extends transversely between opposite end faces 51 and 53. Each slot 91 is cylindrically bored adjacent the end faces 51 and 53 for receiving cylindrically shaped seal pins 93 having slots 95 therein (FIG. 4) aligned with the respective slot 91 in the rotor. Shims 97 and springs 99 are provided for biasing the seal pins 93 outwardly against the end walls 25 and 27 of the outer body 23. Slidably mounted in a radial direction in each slot 91 and with a slight lateral clearance are two sealing members 101 and 103. Seal 101 may be referred to as the trailing seal and seal 103 may be referred to as the leading seal of each seal and vent means 61. The seals 101 and 103 are each formed of two pieces 105 and 107, and 109 and 111, respectively (see FIGS. 5 and 6). The two pieces of each seal together give a generally rectangular shape to the respective seal. The piece 105 of seal 101 and the piece 109 of seal 103 are cut at an angle at opposite ends thereof and slidably support the pieces 107 and 111, respectively, which are generally triangular in shape. Each of the pieces of the seals 101 and 103 has a depending foot 112 adjacent the end faces of the rotor. A double leaf spring 113 comprising two individual springs 115 and 117 connected together at approximately their mid-points by a web 119 is fitted against the radially inward surface of the slot 91. The ends of the springs 115 and 117 engage the radially inward edge of the pieces of seals 101 and 103 adjacent the respective foot portions 112 for biasing the seals 101 and 103 into engagement with the inner periphery surface 28 of the peripheral wall 29 of the end walls 25 and 27.

The leading and trailing apex seals 101 and 103 are in face-to-face relationship and have mating recesses or cutout portions 129 in the outer edge portions of their interfaces, thereby providing openings 131 (see FIG. 3). The openings are separated by mating ribs 133 on each of the seal pieces 105 and 109. Cutout portions 129 in the pieces 105 and 109 open into enlarged recesses 135 and 137 of pieces 105 and 109, respectively. Hollow portions 135 and 137 are aligned and meet with one another to form a vent cavity. The ends of pieces 105 and 109, opposite their angled ends, are provided with radially extending recesses 139 and 141, respectively which are connected by an axially extending channel 143 to the respective enlarged recess portions 135 and 137. As will be made apparent hereinafter recess 141 permits unburned fuel which is forced past the corner of the trailing seal 101 formed by pieces 105 and 107 to be directed to the mating enlarged recesses 135 and 137 in the seals. Unburned fuel which is forced over the outer edge of trailing seal 101 tends to pass, in a manner hereinafter described, through openings 131 into the enlarged recessed portions 135 and 137.

Piece 109 of trailing seal 103 has two ports 145 extending from the recessed portions 137 to the outside of the seal. Ports 145 are aligned with ports 147 in the rotor 49, and the latter ports open into a pair of tubes 149 extending in a generally radial direction through rotor 49 to an internal support of a bearing 151 journaled on eccentric 47. As shown in FIG. 7, tubes 149 are closed at their inner ends by plugs 153 secured in the tubes by a pin 155, which also extends through a web 157 in rotor 49 and prevents the tubes 149 from turning.

The tubes 149 have axial aligned holes 159 which are located within an axially extending transfer tube 161 extending from end face 51 to end face 53. As shown, transfer tube 161 has plugs 163 in its opposite ends. The plugs 163 have a relatively small passage 165 therein extending from the interior of transfer tube 161 to the end faces 51 and 53.

The end faces 51 and 53 are recessed as indicated at 167 between the end seal 63 and the oil seals 77. Each recess extends completely around each end face 51 and 53 and is bounded by axially extending edges 169 and 171 (see FIGS. 1 and 7). The depth of recess 167 increases as the width of the recess 167 decreases as shown in FIGS. 1 and 7. Passages 165 open into the recess 167 so that unburned fuel passing through the openings 131 in seals 101 and 103 passes from such openings through the cavity formed by mating enlarged recesses 135 and 137, ports 145 and 147, tubes 149, holes 159, transfer tube 161, and passages 165 into the recessed portion 167.

Means is provided for placing the recesses 167 in constant communication with intake ports 71. This means is in the form of a channel 181 formed in each of the end walls 25 and 27 which extends away from the intake ports 71 in a direction opposite to the direction of rotation of the rotor 49. A bridge 183 (see FIG. 8) is formed across each channel at the juncture of the latter with the respective intake port 71 to prevent the respective seal 63 from dropping into the channel 181 and being caught or snagged on the edge of the channel. Each channel 181 includes a tunnel 185 extending under bridge 183 and placing the channel in communication with the respective intake port. It will be seen that as the rotor moves in a clockwise path as viewed in FIG. 1 with the apex seal and vent means 61 in constant contact with the inner surface 28 of the peripheral wall 29 the intake ports per se are in communication with the adjacent recess 167 a substantial portion of the time. However, at certain times during the movement of the rotor, such as when the rotor is in the position shown in FIG. 1, when the fuel-air mixture in the chamber adjacent spark plug 75 is under very high pressure and leakage past apex seals 61 is greatest, the intake ports 71 per se are not in communication with the recesses 167 and would not provide a vent for the unburned fuel leaking past the apex seals. However, at this time the channels 181 are axially aligned with and in communication with recesses 167, thereby placing the latter in communication with the intake ports so that a portion of the unburned fuel forced past the apex seals adjacent the chamber during high pressures is vented to the intake ports. The provision of the channels 181 for placing the annular recesses 167 in constant communication with intake ports 71 is an advantageous feature whether or not it is employed with a rotor having vented apex seals. Any unburned fuel which is forced inwardly past seals 163 is immediately vented to the intake ports rather than being trapped between the rotor faces and the outer body end walls.

Operation of the apparatus of this invention is as follows:

Assuming the rotor 49 is in the position shown in FIG. 1, a fuel-air mixture is admitted into the cavity 31 through the port 71. The fuel-air mixture in the chamber adjacent ports 71 is then compressed as the rotor moves in a clockwise direction until the peripheral portion of the rotor which was originally adjacent the intake port 71, such position being indicated by the reference character A in FIG. 1, is adjacent the spark plug 75 in the position indicated by reference character B. In this position the fuel-air mixture is in maximum compression and the pressure adjacent the apex seal and vent means 61 forces the seals 101 and 103 of the leading apex portion to be forced as a unit against the leading side of the respective slot 91 (see FIG. 2). For the same reason the seals 101 and 103 of the trailing apex portion are forced as a unit against the trailing side of the respective slot 91. With regard to the leading apex portion, movement of seal 101 away from the wall of the slot 91 adjacent the fuel-air mixture, which is in a high pressured condition, causes a portion of the high pressure fuel-air mixture to pass between thte seal 101 and the adjacent side of slot 91 to the area around spring 113 between the inner edges of the seals and the bottom of the slot. This high pressure fuel-air mixture assists the spring 113 in forcing the seals toward the inner surface of the peripheral wall. However, the pressure adjacent the outer end of the trailing seal 101 of the leading apex portion may be high enough to cause the seal 101 to move slightly away from the inner surface 28 of peripheral wall 29. If such movement of the trailing seal 101 occurs, unburned fuel-air mixture particles will leak past the seal.

Since the intake ports 71 are in communication with the openings 131 between the seals, and since the pressure in the intake port is considerably less than the pressure of the fuel-air mixture adjacent the leading apex portion 61 when the rotor is in position B, a portion of the fuel-air mixture which reaches openings 131 in the leading apex portion is delivered, due to pressure differences, through the cavity formed by mating enlarged recesses 135 and 137, ports 145 and 147, tubes 149, holes 159, transfer tube 161, passages 165, recess portions 167 adjacent side walls 25 and 27 and around the latter until the fuel-air mixture reaches channels 181. The fuel-air mixture then passes through the channels 181 to the intake ports 71 from which it is delivered back to the working chamber for the next working cycle. A substantial reduction in the amount of unburned fuel-air mixture leaking past the leading apex portion into the exhaust system is accomplished since the pressure differences between the intake ports 71 and the ignition chamber are sufficient to cause a substantial portion of the unburned fuel-air mixture to be delivered through the vent passages.

The pressure of the fuel-air mixture adjacent the trailing apex portion 61 when the rotor is in position B is also relatively high and, as mentioned previously, the seals 101 and 103 are forced as a unit against the trailing side of the respective slot 91. This provides a space between the seal 103 and the adjacent side of the slot and some fuel-air mixture passes through this space to the ports 147. This leakage is then returned to the intake ports 71 in the same manner as previously described. Obviously, it is desirable to minimize the amount of this leakage so that a substantial power loss will not occur. This may be accomplished by proper selection of the maximum clearance between the seal 103 and the adjacent side of the slot and by the proper restriction of the size of ports 147. Thus the maximum amount of fuel which can escape can be conrtolled. Leakage of some fuel past the trailing apex portion 61 when the rotor is in position B may occur over the seals 103 and 101 and also through the ports 147 and connecting rotor passages. This fuel, which may be rich in unburned hydrocarbons, is not lost, but may be used again during the next ignition cycle.

It will be understood that the areas between the side faces 51 and 53 of the rotor 49 outwardly of the seals 63 and the adjacent end walls 25 and 27 of the outer body are relatively thin and flat. Any unburned fuel which enters such areas usually remains in any unburned state after ignition of the main portion of the fuel by spark plug 75. The fuel in the thin flat areas, which are often referred to as quench areas, remains in an unburned state because of the cooling effect of surrounding metal. It will be noted that the quench areas of this invention are relatively small because the seals 63 are located close to the periphery of the rotor 49. The amount of unburned fuel which can collect in the quench areas is thus also relatively small.

On recent tests of a rotary combustion engine constructed in accordance with this invention and a rotary combustion engine having apex seals which were not vented to the intake ports, it was found that the engine constructed in accordance with this invention produced hydrocarbon emissions which were as much as approximately one-third less, in parts per million, than the hydrocarbon emissions of a rotary combustion engine which was not vented in accordance with this invention. This represents a significant step in solving the problem of reducing hydrocarbon emissions of rotary combustion engines of the type disclosed in the aforementioned U.S. Patent No. 2,988,065. In addition, the unburned hydrocarbons which are returned to the intake ports 71 obviously may be utilized during the subsequent working cycle, thus increasing the fuel economy of the engine.

Instead of venting directly into the intake ports 71 apparatus is also provided for venting the unburned fuel-air mixture into the oil sump surrounding eccentric 47. As shown in FIG. 7, the tubes 149 may be provided with holes 187 which place the interior of the tubes in connection with the oil sump. Conventional equipment may be utilized for returning the unburned fuel admitted to the sump to the carburetion apparatus or the intake ports. However, as shown in FIG. 7 the holes 187 in tubes 149 are plugged by pins 189 held in the holes by screw members 191 threaded through the end faces 51 and 53 of rotor 49. This prevents delivery of the unburned fuel-air mixture to the sump, thereby insuring that all of the unburned fuel-air mixture in tubes 149 is delivered directly to the intake ports through the previously described vent passages. It will be understood that if the holes 187 are unplugged so that the unburned fuel-air mixture is delivered to the sump, the passages 165 in plugs 163 may be closed to facilitate venting to the sump.

It will be seen that the apparatus of this invention reduces the unburned fuel-air mixture emissions, thereby increasing the acceptability of this type of rotary combustion engine.

In view of the foregoing it will be seen that the several objects and other advantages of this invention are attained.

We claim:

1. A rotary mechanism comprising an outer body having axially spaced end walls and a peripheral wall interconnecting the end walls to form a cavity therebetween having a longitudinal axis, the inner surface of said peripheral wall having a multilobed profile, said outer body having an intake means for admitting fuel to said cavity, an inner body in said cavity and rotatable relative to said outer body about an axis spaced from but parallel to said longitudinal axis, said inner body having a plurality of circumferentially spaced apex portions around its periphery, each apex portion having sealing means engaging the inne surface of said peripheral wall, and means forming a vent passage from each sealing means through the interior of said inner body into communication with said intake means.

2. A rotary mechanism comprising an outer body having axially spaced end walls and a peripheral wall interconnecting the end walls to form a cavity therebetween having a longitudinal axis, the inner surface of said peripheral wall having a multi-lobed profile, said outer body having an intake port for admitting fuel to said cavity, an inner body in said cavity and rotatable relative to said outer body about an axis spaced from but parallel to said longitudinal axis, said inner body having a plurality of circumferentially spaced apex portions around its periphery, each apex portion having sealing means engaging the inner surface of said peripheral wall and extending between opposite side faces of said inner body, one of said side faces of said inner body having an annular recess therein, means forming a passage extending through said inner body from each of said sealing means to said annular recess, and means forming a passage in said outer body for placing said annular recess in communication with fuel entering said cavity through said intake port, each apex portion having a slot therein extending between said opposite side faces of said inner body, each of said sealing means including two seals in the respective slot, said seals being face-to-face with one another, at least one of said seals having a recess in its interface to provide a vent opening between said seals, and at least one port in one of said seals placing said vent opening in communication with said passage means in said inner body.

3. A rotary mechanism as set forth in claim 2 wherein each of said means forming a passage through said inner body provides at least one passage extending inwardly from a point adjacent the seal having a port therein, and a second passage extending from said first passage to said annular recess.

4. A rotary mechanism as set forth in claim 3 wherein said intake port opens into the end wall adjacent said annular recess, said annular recess being axially aligned with said intake port during a portion of the relative rotation between said bodies, said means forming a passage in said outer body for placing said annular recess in communication with fuel entering said cavity through said intake port comprising a channel in the end wall adjacent said annular recess, one portion of said channel being axially aligned with said annular recess during the remaining portion of the relative rotation between said bodies, one end of said channel being in communication with said intake port, whereby said intake port is in communication with said annular recess at all times during the relative rotation between said bodies.

5. A rotary mechanism as set forth in claim 4 wherein said inner body has an annular seal located in said one side face outwardly of said annular recess, said channel having a bridge member thereover to inhibit interference between the annular seal and the edge of said channel.

6. A rotary mechanism comprising an outer body having axially spaced end walls and a peripheral wall interconnecting the end walls to form a cavity therebetween having a longitudinal axis, the inner surface of said peripheral wall having a multi-lobed profile, said outer body having an intake port for admitting fuel to said cavity, an inner body in said cavity and rotatable relative to said outer body about an axis spaced from but parallel to said longitudinal axis, said inner body having a plurality of circumferentially spaced apex portions around its periphery, each apex portion having sealing means engaging the inner surface of said peripheral wall and extending between opposite side faces of said inner body, one of said side faces of said inner body having an annular recess therein, means forming a passage extending through said inner body from each of said sealing means to said annular recess, and means forming a passage in said outer body for placing said annular recess in communication with fuel entering said cavity through said intake port, each apex portion having a slot therein extending between said opposite side faces of said inner body, each of said sealing means including two seals located in the respective slot in face-to-face relationship, each seal being formed of an elongated member one end of which is angled relative to its inner and outer edges and a generally triangularly-shaped member one edge of which engages the angled end of the respective elongated member, the triangularly-shaped member of each seal being in face-to-face relationship with elongated member of the adjacent seal.

7. A rotary mechanism as set forth in claim 6 wherein said members of each of said seals have mating recesses in their interfaces extending inwardly from their outer edges, said recesses forming an elongated cavity between said seals of each sealing means, and at least one port in one of said members placing said elongated cavity in communication with said passage means in said inner body.

8. A rotary mechanism as set forth in claim 7 including a second port in said one member, each of said means forming a passage through said inner body providing first and second passages extending inwardly from a point adjacent said first and second ports, respectively, and third passage extending from said first and second passages to said annular recess, said first, second and third being in communication with one another.

9. A rotary mechanism as set forth in claim 8 wherein said intake port opens into the end wall adjacent said annular recess, said annular recess being axially aligned with said intake port during a portion of the relative rotation between said bodies, said means forming a passage in said outer body for placing said annular recess in communication with fuel entering said cavity through said intake port comprising a channel in the end wall adjacent said annular recess, one portion of said channel being axially aligned with said annular recess during the remaining portion of the relative rotation between said bodies, one end of said channel being in communication with said intake port, whereby said intake port is in communication with said annular recess at all times during the relative rotation between said bodies.

10. A rotary mechanism as set forth in claim 9 wherein said inner body has an annular seal in its said one side face located outwardly of said annular recess, said channel having a bridge member thereover to inhibit interference between the annular seal and the edge of said channel.

11. A rotary mechanism comprising an outer body having axially spaced end walls and a peripheral wall interconnecting the end walls to form a cavity therebetween having a longitudinal axis, the inner surface of said peripheral wall having a multi-lobed profile, said outer body having an intake means for admitting fuel to said cavity, an inner body in said cavity and rotatable relative to said outer body about an axis spaced from but parallel to said longitudinal axis, said inner body having a plurality of circumferentially spaced apex portions around its periphery, each apex portion having sealing means engaging the inner surface of said peripheral wall, means forming a vent passage from each sealing means through the interior of said inner body into communication with said intake means, means for biasing each of said sealing means toward engagement with said peripheral wall and said end walls, said means forming a vent passage through the interior of said inner body providing a first passage extending inwardly from a point adjacent each sealing means, a second passage extending laterally from said first passage to one of the side faces of said inner body, said one side face of said inner body having an annular recess therein into which said second passage opens, said means forming a vent passage which communicates with said intake means comprising a channel in the end wall of said outer body adjacent said annular recess, one portion of said channel being axially aligned with said annular recess during portions of the relative rotation between said bodies, and one end of said channel being in communication with said intake means.

12. A rotary mechanism as set forth in claim 11 wherein said inner body has an annular seal in its said one side face located outwardly of said annular recess, said channel having a bridging member thereover to inhibit interference between the annular seal and the edge of said channel.

13. A rotary mechanism comprising an outer body having axially spaced end walls and a peripheral wall interconnecting the end walls to form a cavity therebetween having a longitudinal axis, the inner surface of said peripheral wall having a multi-lobed profile, said outer body having an intake means for admitting fuel to said cavity, an inner body in said cavity and rotatable relative to said outer body about an axis spaced from but parallel to said longitudinal axis, said inner body having a plurality of circumferentially spaced apex portions around its periphery, each apex portion having sealing means engaging the inner surface of said peripheral wall, means forming a vent passage from each sealing means through the interior of said inner body into communication with said intake means, each apex portion having a slot therein extending between said opposite side faces of said inner body, each of said sealing means including two seals located in the respective slot in face-to-face relationship, each seal being formed of an elongated member one end of which is angled relative to its inner and outer edges and a generally triangularly-shaped member one edge of which engages the angled end of the respective elongated member, the triangularly-shaped member of each seal being in face-to-face relationship with elongated member of the adjacent seal.

14. A rotary mechanism as set forth in claim 13 wherein said members of each of said seals have mating recesses in their interfaces extending inwardly from their outer edges, said recesses forming an elongated cavity between said seals of each sealing means, and at least one port in one of said members placing said elongated cavity in communication with said passage means in said inner body.

15. A rotary mechanism comprising an outer body having axially spaced end walls and a pehipheral wall interconnecting the end walls to form a cavity therebetween having a longitudinal axis, the inner surface of said peripheral wall having a multi-lobed profile, said outer body having an intake port for admitting fuel to said cavity, an inner body in said cavity and rotatable relative to said outer body about an axis spaced from but parallel to said longitudinal axis, said inner body having a plurality of circumferentially spaced apex portions around its periphery, each apex portion having sealing means engaging the inner surface of said peripheral wall and extending between opposite side faces of said inner body, one of said side faces of said inner body having an annular recess therein, and means forming a passage in said outer body for placing said annular recess in communication with fuel entering said cavity through said intake port, said intake port opening into the end wall adjacent said annular recess, said annular recess being axially aligned with said intake port during a portion of the relative rotation between said bodies, said means forming a passage in said outer body for placing said annular recess in communication with fuel entering said cavity through said intake port comprising a channel in the end wall adjacent said annular recess, one portion of said channel being axially aligned with said annular recess during the remaining portion of the relative rotation between said bodies, one end of said channel being in communication with said intake port, whereby said intake port is in communication with said annular recess at all times during the relative rotation between said bodies.

16. A rotary mechanism as set forth in claim 15 wherein said inner body has an annular seal in its said one side face located outwardly of said annular recess, said channel having a bridge thereover to inhibit interference between the annular seal and the edge of said channel.

References Cited

UNITED STATES PATENTS 3,142,440   7/1964   Schagg _____ 230—145

CARLTON R. CROYLE, *Primary Examiner.*

D. HART, *Assistant Examiner.*